United States Patent
Numamae et al.

(10) Patent No.: US 10,782,555 B2
(45) Date of Patent: Sep. 22, 2020

(54) LIQUID CRYSTAL PANEL

(71) Applicant: NIPPON SEIKI CO., LTD., Niigata (JP)

(72) Inventors: Ayuko Numamae, Niigata (JP); Kazuya Ootaki, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 0 days.

(21) Appl. No.: 16/623,631

(22) PCT Filed: Jun. 20, 2018

(86) PCT No.: PCT/JP2018/023385
§ 371 (c)(1),
(2) Date: Dec. 17, 2019

(87) PCT Pub. No.: WO2018/235847
PCT Pub. Date: Dec. 27, 2018

(65) Prior Publication Data
US 2020/0192155 A1 Jun. 18, 2020

(30) Foreign Application Priority Data
Jun. 23, 2017 (JP) ................................ 2017-122841

(51) Int. Cl.
*G02F 1/1335* (2006.01)
*G02F 1/1347* (2006.01)
(52) U.S. Cl.
CPC ...... *G02F 1/133536* (2013.01); *G02F 1/1347* (2013.01)
(58) Field of Classification Search
None
See application file for complete search history.

(56) References Cited

U.S. PATENT DOCUMENTS 6,433,853 B1 * 8/2002 Kameyama .......... G02B 5/3016
349/115
2004/0100598 A1 * 5/2004 Adachi ............ G02F 1/133536
349/113

(Continued)

FOREIGN PATENT DOCUMENTS

| JP | 2001-318374 A | 11/2001 |
| JP | 3419766 B2 | 6/2003 |
| WO | 2017/073498 A1 | 5/2017 |

OTHER PUBLICATIONS

International Search Report issued in corresponding International Patent Application No. PCT/JP2018/023385, dated Sep. 4, 2018, with Engish translation.

*Primary Examiner* — Ryan Crockett
(74) *Attorney, Agent, or Firm* — McDermott Will & Emery LLP

(57) ABSTRACT

A liquid crystal panel is switched between a transmission state and a reflection state. The liquid crystal panel includes an absorption type polarizing plate on one side of a liquid crystal element, and a reflection type polarizing plate on the other side thereof. In the reflection state, light incident from the absorption type polarizing plate and transmitted through the liquid crystal element has a polarization axis along the reflection axis of the reflection type polarizing plate, and is reflected by the reflection type polarizing plate. In the transmission state, the light incident from the absorption type polarizing plate and transmitted through the liquid crystal element has a polarization axis along the transmission axis orthogonal to the reflection axis, and is transmitted through the reflection type polarizing plate. The absorption type polarizing plate has an average polarization degree of 60-80% inclusive at wavelengths of 450-650 nm.

2 Claims, 3 Drawing Sheets

(56) References Cited

U.S. PATENT DOCUMENTS

| | | | |
|---|---|---|---|
| 2007/0242187 A1* | 10/2007 | Yamaki | G02F 1/133536 349/96 |
| 2008/0303986 A1* | 12/2008 | Yamaki | G02F 1/133536 349/96 |
| 2011/0051053 A1* | 3/2011 | Okamura | G02B 5/3083 349/96 |
| 2015/0049283 A1* | 2/2015 | Hwang | G02F 1/133536 349/96 |
| 2015/0124194 A1* | 5/2015 | Oya | B32B 27/20 349/61 |
| 2018/0284538 A1* | 10/2018 | Ohira | G02F 1/133514 |
| 2018/0321546 A1* | 11/2018 | Sakai | B60R 1/088 |

\* cited by examiner

| PANEL | DEGREE OF POLIRIZATION (%) | REFLECTION STATE REFLECTANCE (%) | TRANSMISSION STATE REFLECTANCE (%) |
|---|---|---|---|
| A | 57.7 | 45.4 | 12.5 |
| B | 64.6 | 45.3 | 10.6 |
| C | 72.5 | 42.5 | 8.6 |
| D | 85.1 | 38.0 | 7.5 |
| E | 99.9 | 34.7 | 6.9 |

— # LIQUID CRYSTAL PANEL

CROSS REFERENCE

This application is the U.S. National Phase under 35 U.S.C § 371 of International Application No. PCT/JP2018/023385, filed on Jun. 20, 2018, which claims the benefit of Japanese Application No. 2017-122841, filed on Jun. 23, 2017, the entire contents of each are hereby incorporated by reference.

TECHNICAL FIELD

The present invention relates to a liquid crystal panel.

BACKGROUND ART

A liquid crystal panel described in Patent Document 1 includes a liquid crystal layer sealed between a pair of substrates, and an absorption type polarizing plate and a reflection type polarizing plate between which the pair of substrates is interposed, and the liquid crystal panel is switchable between a transmission state and a mirrored state (reflection state). In the transmission state, the liquid crystal panel of Patent Document 1 allows an object (an image display in Patent Document 1) located behind the liquid crystal panel to be visually recognized.

PRIOR ART DOCUMENT

Patent Document

Patent Document 1: Japanese Patent No. 3419766

SUMMARY OF THE INVENTION

Problems to be Solved by the Invention

In the reflection state, this type of liquid crystal panel preferably has a high total light reflectance in view of the function as a mirror. In contrast, in the transmission state, the liquid crystal panel preferably has a low total light reflectance in view of the visibility of the back side. Therefore, there is a problem in making both compatible.

The present invention is made in view of the above circumstance, and an object of the present invention is to provide a liquid crystal panel that compatibly has an appropriate reflectance in a reflection state and an appropriate reflectance in a transmission state.

Solution to Problem

In order to achieve the above object, a liquid crystal panel in dispense to a first aspect of the present invention is switchable between a transmission state and a reflection state in response to application of voltage. The liquid crystal panel includes, a liquid crystal element including a liquid crystal layer and transparent electrodes to apply voltage to the liquid crystal layer, an absorption type polarizing plate provided at one side of the liquid crystal element, and a reflection type polarizing plate provided at the other side of the liquid crystal element and located opposed via the liquid crystal element to the absorption type polarizing plate. In the reflection state, light incident on the absorption type polarizing plate and transmitted through the liquid crystal element becomes light having a polarizing axis along a reflection axis of the reflection type polarizing plate, and is reflected on the reflection type polarizing plate. In the transmission state, light incident on the absorption type polarizing plate and transmitted through the liquid crystal element becomes light having a polarizing axis along a transmission axis intersecting with the reflection axis of the reflection type polarizing plate, and is transmitted through the reflection type polarizing plate. The absorption type polarizing plate has an average degree of polarization of 60% or greater and 80% or smaller at a wavelength of 450 nm to 650 nm.

Effect of the Invention

According to an aspect of the present invention, a liquid crystal panel that compatibly has an appropriate reflectance in a reflection state and an appropriate reflectance in a transmission state can be provided.

MODE FOR CARRYING OUT THE INVENTION

An embodiment of the present invention will be described with reference to the drawings.

Figure 1:
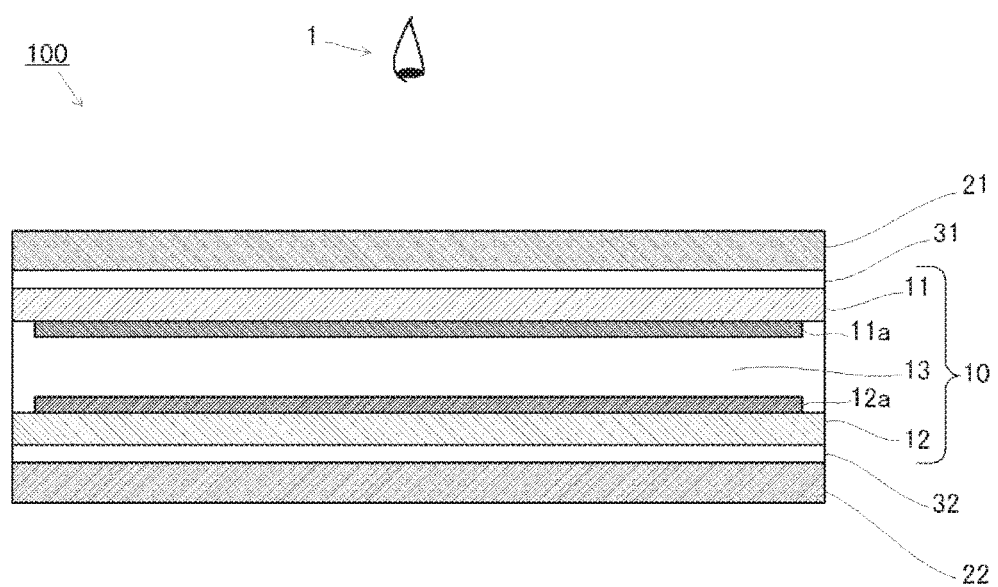
FIG. 1 is a schematic cross-sectional view of a liquid crystal panel according to an embodiment of the present invention.
Figure 2A:
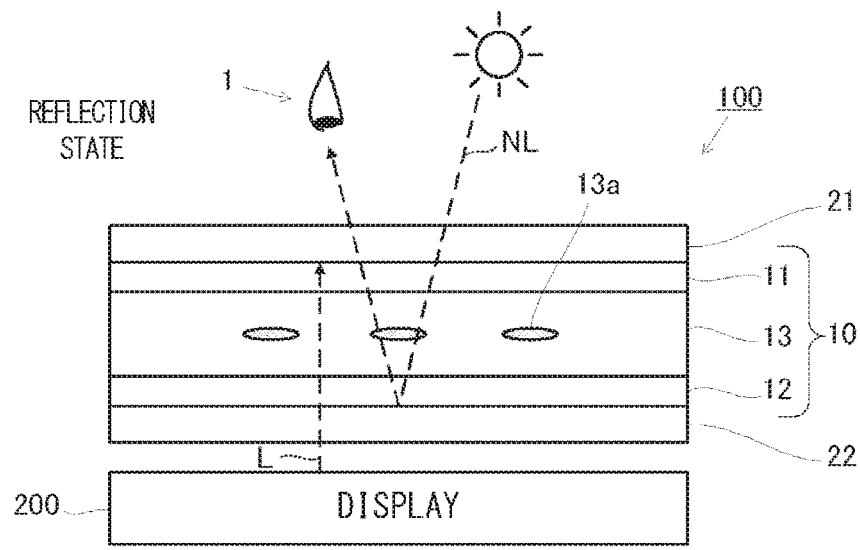
FIG. 2A is an explanatory diagram illustrating a reflection state.
Figure 2B:
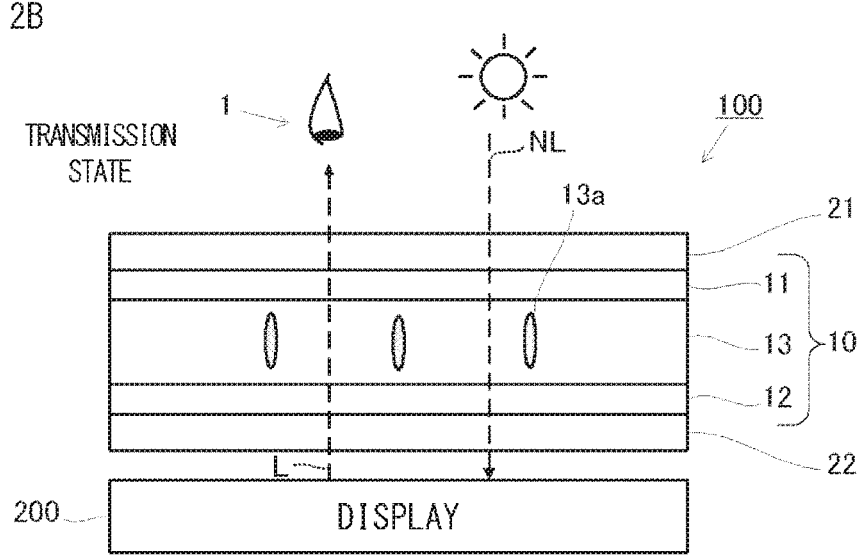
FIG. 2B is an explanatory diagram illustrating a transmission state.

A liquid crystal panel 100 according to an embodiment of the present invention is a twisted nematic (TN) type liquid crystal panel and is structures as illustrated in a schematic cross-sectional view of FIG. 1. The liquid crystal panel 100 is structured to be switchable between a transmission state and a reflection state. As illustrated in FIG. 2B, the liquid crystal panel 100 in the transmission state allows a displayed image on a display 200 disposed behind the liquid crystal panel to be transmitted and visually recognized by an observer 1. In contrast, as illustrated in FIG. 2A, the liquid crystal panel 100 in the reflection state functions as a mirror that reflects external light NL or the like toward the observer 1.

Herein, for facilitating easy understanding of the descriptions, the side of the observer 1 of the liquid crystal panel 100 will be referred to as "the front side" and the opposite side of the observer 1 will be referred to as "the back side", and components of the liquid crystal panel will be described. Further, in consideration of the visibility of the drawings, in FIGS. 1 and 2A, 2B, hatching indicating cross sections is omitted as appropriate. Furthermore, in FIGS. 2A and 2B illustrating the function of the liquid crystal panel 100, members are omitted as appropriate.

As illustrated in FIG. 1, the liquid crystal panel 100 includes a liquid crystal element 10, an absorption type polarizing plate 21 located on the front side of the liquid crystal element 10, and a reflection type polarizing plate 22 located on the back side of the liquid crystal element 10.

Though not illustrated, the liquid crystal panel 100 is formed, for example, in a substantially rectangular shape in planar view.

As illustrated in FIG. 1, the liquid crystal element 10 includes a first substrate 11, a second substrate 12, and a liquid crystal layer 13.

The first substrate 11 and the second substrate 12 are pair of transparent substrates opposed to each other and are made of, for example, glass, plastic, or the like. The first substrate 11 and the second substrate 12 are arranged to face each other in a state where the liquid crystal layer 13 is interposed between the first substrate 11 and the second substrate 12 and in a state where main surfaces (opposed surfaces) of the first substrate 11 and the second substrate 12 are parallel to each other. The first substrate 11 is located on the front side of the liquid crystal layer 13.

A transparent electrode 11a is provided on the liquid crystal layer 13 side of the first substrate 11. A transparent electrode 12a is provided on the liquid crystal layer 13 side of the second substrate 12. The transparent electrodes 11a, 12a are formed by a well-known technique such as sputtering, vapor deposition, or the like. In the present embodiment, each of the transparent electrodes 11a, 12a is formed in a solid shape on the corresponding substrate surface and has a substantially rectangular shape in planar view. The transparent electrodes 11a, 12a are formed of indiumtinoxide (ITO) films mainly including indium oxide or are formed of another material. Voltage may be applied via the transparent electrodes 11a, 12a to the liquid crystal layer 13 in a drive method of either a passive method or an active method.

Further, an insulating film (not illustrated) and an alignment film (not illustrated) are formed on each of the first substrate 11 and the second substrate 12. The insulating film is made of a silicon-based insulating film and is formed to cover each of the transparent electrodes 11a, 12a from the liquid crystal layer 13. Furthermore, the alignment film is formed between the insulating film and the liquid crystal layer 13. That is, the transparent electrode 11a, the insulating film, and the alignment film are stacked in layers on the first substrate 11. In addition, the transparent electrode 12a, the insulating film, and the alignment film are stacked in layers on the second substrate 12.

The alignment film is in contact with the liquid crystal layer 13 and define an alignment state of the liquid crystal molecules 13a included in the liquid crystal layer 13 (schematically illustrated in FIGS. 2A and 2B), and the alignment film is made of, for example, polyimide by a known method (for example, flexographic printing). A rubbing process is applied to the alignment film. In the present embodiment, the rubbing direction of the alignment film on the front side (i.e., the alignment film formed on the first substrate 11) is substantially perpendicular (or just perpendicular) to the rubbing direction of the alignment film on the back side (i.e., the alignment film formed on the second substrate) as viewed in a normal direction of the substrates (in a normal direction of the opposed surfaces of the first substrate 11 and the second substrate 12). The alignment of the liquid crystal molecules 13a is regulated by the alignment films to which the rubbing process is applied as just described. The alignment process applied to the alignment films is not limited to the rubbing process. Alternatively, another known process such as a photo-alignment process, a protrusion alignment process, or the like may be applied to the alignment films.

A liquid crystal material is sealed in a sealed space formed by a seal material (not illustrated) adapted to connect the first substrate 11 and the second substrate 12 and by the both substrates, and thus the liquid crystal layer 13 is formed. The thickness (cell gap) of the liquid crystal layer 13 is defined by a spacer (not illustrated) provided between the first substrate 11 and the second substrate 12. The long axis of the liquid crystal molecules 13a of the liquid crystal layer 13 is oriented twisted at 90 degrees (twist angle is 90°) between ends of the first substrate 11 and the second substrate 12 by alignment regulating force of the alignment films, and the long axis of the liquid crystal molecules 13a is oriented to gradually rotate (swivel) from one of the substrates toward the other of the substrates (chiral structure). Thus, the liquid crystal layer 13 has chirality when no voltage is applied.

The absorption type polarizing plate 21 includes a transmission axis (hereinafter, also referred to as a first transmission axis) and an absorption axis orthogonal to the first transmission axis. Of the incident light, light in a polarizing direction parallel to the first transmission axis is allowed by the absorption type polarizing plate 21 to pass therethrough.

The reflection type polarizing plate 22 includes a transmission axis (hereinafter, also referred to as a second transmission axis) and a reflection axis orthogonal to the second transmission axis. Of the incident light, light in a polarizing direction parallel to the second transmission axis is allowed by the reflection type polarizing plate 22 to pass therethrough and light in a polarizing direction parallel to the reflection axis is allowed by the reflection type polarizing plate 22 to reflect.

In the present embodiment, the absorption type polarizing plate 21 and the reflection type polarizing plate 22 are disposed (in a parallel Nicor arrangement) such that the first transmission axis of the absorption type polarizing plate 21 and the second transmission axis of the reflection type polarizing plate 22 are substantially parallel (or just parallel) to each other. In addition, the rubbing direction of the alignment film on the front side (i.e., the alignment film formed on the first substrate 11) is set parallel to the direction along the absorption axis of the absorption type polarizing plate 21.

The absorption type polarizing plate 21 is attached via a first transparent adhesive film 31 to the front side surface of the first substrate 11. The reflection type polarizing plate 22 is attached via a second transparent adhesive film 32 to the back side surface of the second substrate 12. In addition, an optical element such as a retardation film may be provided between the liquid crystal element 10 and each of the polarizing plates. In such a case, the polarizing plate may be attached to the optical element located between the liquid crystal element 10 and the polarizing plate.

Each of the first transparent adhesive film 31 and the second transparent adhesive film 32 is made of, for example, an acrylic transparent adhesive (acrylic polymer) or the like. The first transparent adhesive film 31 is formed by applying a transparent adhesive to the surface of the absorption type polarizing plate 21 to be attached to the first substrate 11. The second transparent adhesive film 32 is formed by applying a transparent adhesive to the surface of the reflection type polarizing plate 22 to be attached to the second substrate 12.

When being in the transmission state, the liquid crystal panel 100 configured as described above allows transmission of a display light L (light representing a displayed image) of the display 200 as illustrated in FIG. 2B. The display 200 located on the back side of the liquid crystal panel 100 includes, for example, a liquid crystal display having a backlight, or an organic electro luminescence (EL) display, and displays an image toward the liquid crystal panel 100. An object to be transmitted visually recognizably by the liquid crystal panel 100 in the transmission state is not limited to the display 200, and may be a character plate or a signboard, or a landscape.

Here, the liquid crystal panel 100 is switchable between the reflection state and the transmission state.

Reflection State

In a state where no drive voltage is applied, the liquid crystal molecules 13a are substantially parallel to the substrate surfaces in the liquid crystal panel 100 as illustrated in FIG. 2A, and the liquid crystal layer 13 holds the chirality. In such a state, when the external light NL is incident on the front side of the liquid crystal panel 100, the external light NL passes through the absorption type polarizing plate 21 and becomes linear polarized light parallel to the first transmission axis. Afterward, the external light NL passes through the liquid crystal layer 13 and then the polarizing direction is converted by 90° by the chirality of the liquid crystal layer 13. Accordingly, the external light NL becomes linear polarized light along the reflection axis of the reflection type polarizing plate 22, therefore being reflected on the reflection type polarizing plate 22. The reflected light passes through the liquid crystal layer 13 and then the polarizing direction is again converted by 90° therefore, the light passes through the absorption type polarizing plate 21. As just described, the liquid crystal panel 100 in the reflection state functions as a minor. Herein, a portion of the liquid crystal panel 100, which functions as a mirror will be referred to as an active area.

On the other hand, when the display light L is incident on the back side of the liquid crystal panel 100, thereafter the display light L passes through the reflection type polarizing plate 22 and becomes linear polarized light parallel to the second transmission axis. Afterward, the display light L passes through the liquid crystal layer 13 and then the polarizing direction is converted by 90°. Accordingly, the display light L becomes linear polarized light along the absorption axis of the absorption type polarizing plate 21, therefore may be impossible to pass through the absorption type polarizing plate 21. As just described, the display light L may be impossible to travel toward the front side of the liquid crystal panel 100. Therefore, even when the display light L is incident on the liquid crystal panel 100, a displayed image on the display 200 is not recognized by the observer 1. In addition, when being output from the display 200, the display light L may be linear polarized light parallel to the second transmission axis.

Transmission State

In a state where drive voltage is applied, the liquid crystal molecules 13a are oriented in a direction in which the voltage is applied (in the normal direction of the substrates) in the liquid crystal panel 100 as illustrated in FIG. 2B, and the liquid crystal layer loses the chirality. In such a state, when the display light L is incident on the back side of the liquid crystal panel 100, thereafter the display light L passes through the reflection type polarizing plate 22 and becomes linear polarized light parallel to the second transmission axis. However, even when the display light L passes through the liquid crystal layer 13, the polarizing direction is not converted. Accordingly, the display light L passes through the absorption type polarizing plate 21 having the first transmission axis parallel to the second transmission axis. As just described, the liquid crystal panel 100 allows the display light L to pass, and thus a displayed image on the display 200 is transmitted visually recognizably. In addition, when the external light NL is incident on the front side of the liquid crystal panel 100, thereafter the external light NL passes through the absorption type polarizing plate 21 and then passes through the liquid crystal layer 13 while remaining as linear polarized light parallel to the first transmission axis. Therefore, the external light NL passes through the reflection type polarizing plate 22 having the second transmission axis parallel to the first transmission axis and is not reflected on the reflection type polarizing plate 22 (excluding reflected light due to leak light).

Herein, how to set conditions that allow the liquid crystal panel 100 to compatibly have an appropriate total light reflectance in the reflection state and an appropriate total light reflectance in the transmission state will be described mainly with reference to FIG. 3.

The inventors of the present application paid attention to the fact that the reflectance of the liquid crystal panel 100 changes in accordance with the degree of polarization of the absorption type polarizing plate 21, and produced five types of the liquid crystal panel (liquid crystal panels A to E indicated in FIG. 3A) in order to find suitable conditions for the degree of polarization.

The liquid crystal panels A to E have the same configuration as that of the liquid crystal panel 100; however, absorption type polarizing plates of the respective liquid crystal panels have different average degrees of polarization at a wavelength of 450 nm to 650 nm. "The degree of polarization" in FIG. 3 indicates average degrees of polarization at a wavelength of 450 nm to 650 nm, and more specifically, average values of the degree of polarization for each 5 nm at respective wavelengths (450, 455, . . . 645, 650) in the range of 450 nm to 650 nm. Herein, the average degree of polarization at the wavelength of 450 nm to 650 nm will be simply referred to as "the degree of polarization". In addition, samples are made of the following materials. The first substrate 11 and the second substrate 12 are made of glass substrates having thickness of 1.1 mm, available from Nippon Sheet Glass Company, Ltd. A liquid crystal material configuring the liquid crystal layer 13 is manufactured by AGC Seimi Chemical Co., Ltd. The first transparent adhesive film 31 and the second transparent adhesive film 32 having film thickness of 25 μm are manufactured by Polatechno Co., Ltd. The absorption type polarizing plate 21 is manufactured by Polatechno Co., Ltd., and the reflection type polarizing plate 22 is made of Dual Brightness Enhancement Film (DBEF), available from 3M Company.

Figures 3A, 3B:
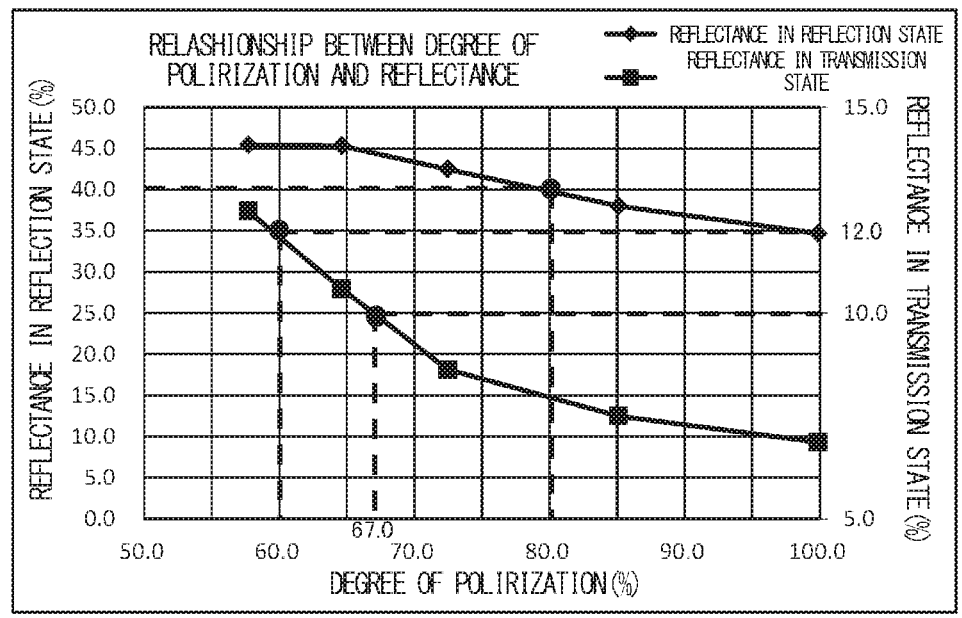
FIG. 3A is a chart illustrating a degree of polarization of an absorption type polarizing plate of each of liquid crystal panels A to E, a reflectance of each liquid crystal panel in a reflection state, and a reflectance of each liquid crystal panel in a transmission state.
FIG. 3B is a diagram illustrating the relationship between the degree of polarization of the absorption type polarizing plate, and the reflectance in the reflection state of the liquid crystal panel and the reflectance of the transmission state of the liquid crystal panel.

Focusing on the degree of polarization, firstly, as indicated in FIG. 3A, the liquid crystal panel A has a degree of polarization of 57.7%, the liquid crystal panel B has a degree of polarization of 64.6%, and the liquid crystal panel C has a degree of polarization of 72.5%. The liquid crystal panel D has a polarization degree of 85.1%, and the liquid crystal panel E has a polarization degree of 99.9%.

The total light reflectance of five types of samples (the liquid crystal panels A to E) prepared as just described was measured. The total light reflectance (herein, simply also referred to as reflectance) is a ratio of the light output toward the front side to all of the light incident on the front side of the liquid crystal panel (from the absorption type polarizing plate 21). The reflectance was measured with an ultraviolet-visible-near-infrared spectrophotometer U-4100, available from Hitachi High-Tech Science Corporation.

Focusing on the reflectance measured as just described, as indicated in FIG. 3A, the reflectance of the liquid crystal panel A in the reflection state is 45.4%, and the reflectance of the liquid crystal panel A in the transmission state is 12.5%. The reflectance of the liquid crystal panel B in the reflection state is 45.3%, and the reflectance of the liquid crystal panel B in the transmission state is 10.6%. The reflectance of the liquid crystal panel C in the reflection state is 42.5%, and the reflectance of the liquid crystal panel C in the transmission state is 8.6%. The reflectance of the liquid crystal panel D in the reflection state is 38.0%, and the reflectance of the liquid crystal panel D in the transmission state is 7.5%. The reflectance of the liquid crystal panel E in the reflection state is 34.7%, and the reflectance of the liquid crystal panel E in the transmission state is 6.9%. Here, the reflectance of the liquid crystal panel 100 in the reflection state is preferably 40% or greater in order that the liquid crystal panel as a mirror obtains a reflected image having a sufficient brightness. For example, an "automotive mirror" according to JIS D 5705 is defined to have a reflectance of 35% or greater. In addition, the reflectance of the liquid crystal panel 100 in the transmission state is preferably 12% or smaller and more preferably 10% or smaller. As a result of earnest examinations by the inventors, it was revealed that in a case where the back side (for example, a displayed image on the display 200) is visually recognized through the liquid crystal panel 100, the visibility significantly decreases when the reflectance is greater than 12%, and that in a case where the back side (for example, a displayed image on the display 200) is transmitted visually recognizably, the visibility with high quality can be obtained when the reflectance is 10% or smaller.

Moreover, focusing on the relationship between the measured reflectance and the reflectance in the reflection state, as indicated in FIG. 3B, when the average degree of polarization of the absorption type polarizing plate 21 at the wavelength of 450 nm to 650 nm is 80% or smaller, the reflectance of the liquid crystal panel 100 in the reflection state is appropriately 40% or greater. Meanwhile, when the average degree of polarization of the absorption type polarizing plate 21 at the wavelength of 450 nm to 650 nm is 60% or greater, the reflectance of the liquid crystal panel 100 in the transmission state is appropriately 12% or smaller. When the average degree of polarization of the absorption type polarizing plate 21 at the wavelength of 450 nm to 650 nm is 67% or greater, the reflectance of the liquid crystal panel 100 in the transmission state is more appropriately 10% or smaller. In other words, in order for the liquid crystal panel 100 to compatibly have an appropriate reflectance in the reflection state and an appropriate reflectance in the transmission state, the average degree of polarization of the absorption type polarizing plate 21 at the wavelength of 450 nm to 650 nm is desirably 60% or greater and 80% or smaller, and more desirably 67% or greater and 80% or smaller.

(1) The liquid crystal panel 100 described above is designed such that the average degree of polarization of the absorption type polarizing plate 21 at the wavelength of 450 nm to 650 nm is 60% or greater and 80% or smaller. Therefore, the liquid crystal panel 100 can compatibly have an appropriate total light reflectance in the reflection state and an appropriate total light reflectance in the transmission state.

(2) Moreover, the liquid crystal panel 100 is designed such that the average degree of polarization of the absorption type polarizing plate 21 at the wavelength of 450 nm to 650 nm is 67% or greater. Therefore, the liquid crystal panel 100 in the transmission state can be a more appropriate total light reflectance.

Note that the present invention is not limited by the foregoing embodiments and the drawings. It will be understood that the embodiments and the drawings may be changed (some of the components may also be omitted).

In the description above, an example is illustrated that the liquid crystal panel 100 is structured such that the first transmission axis of the absorption type polarizing plate 21 is set parallel to the second transmission axis of the reflection type polarizing plate 22, and is designed to be brought into the reflection state when the drive voltage is not applied and to be brought into the transmission state when the drive voltage is applied (normally reflection). However, the liquid crystal panel 100 is not limited to the example. Alternatively, the liquid crystal panel 100 may be structured such that the first transmission axis of the absorption type polarizing plate 21 is set substantially orthogonal to the second transmission axis of the reflection type polarizing plate 22, and may be designed to be brought into the reflection state when the drive voltage is applied and to be brought into the transmission state when the drive voltage is not applied (normally transmission). In the example of normally transmission, the liquid crystal panel 100 is switchable between the reflection state and the transmission state as follows.

Reflection State

In a state where the drive voltage is applied, the liquid crystal molecules 13a are oriented, as described above, in the direction in which the voltage is applied (in the normal direction of the substrates) in the liquid crystal panel 100, and the liquid crystal layer 13 loses the chirality. In such a state, when the external light NL is incident on the front side of the liquid crystal panel 100, thereafter the external light NL passes through the absorption type polarizing plate 21 while remaining as linear polarized light parallel to the first transmission axis. Accordingly, the external light NL becomes the linear polarized light along the reflection axis of the reflection type polarizing plate 22, which is parallel to the first transmission axis, and then is reflected on the reflection type polarizing plate 22. Afterward, the reflected light again passes through liquid crystal layer 13 and passes through the absorption type polarizing plate 21 having the first transmission axis substantially orthogonal to the reflection axis. Thus, the liquid crystal panel 100 in the reflection state functions as a mirror. Meanwhile, when the display light L is incident on the back side of the liquid crystal panel 100, the display light L passes through the reflection type polarizing plate 22 and becomes linear polarized light parallel to the second transmission axis, and then passes through the liquid crystal layer 13. Accordingly, the display light L may be impossible to pass through the absorption type polarizing plate 21 having the absorption axis parallel to the second transmission axis. Thus, the display light L may be impossible to travel toward the front side of the liquid crystal panel 100. Therefore, even when the display light L enters the liquid crystal panel 100, a displayed image on the display 200 is not visually recognized by the observer 1.

Transmission State

In a state where no drive voltage is applied, the liquid crystal molecules 13a are substantially parallel, as described above, to the substrate surfaces in the liquid crystal panel 100, and the liquid crystal layer 13 holds the chirality. In such a state, when the display light L is incident on the back side of the liquid crystal panel 100, the display light L passes through the reflection type polarizing plate 22 and becomes linear polarized light parallel to the second transmission axis. Afterward, the display light L passes through the liquid crystal layer 13 and then the polarizing direction is converted by 90° by the chirality of the liquid crystal layer 13. Accordingly, the display light L passes through the absorption type polarizing plate 21 having the first transmission axis orthogonal to the second transmission axis. As just described, the liquid crystal panel 100 allows the display light L to be transmitted, and thus a displayed image on the display 200 is transmitted visually recognizably. In addition, when the external light NL is incident on the front side of the liquid crystal panel 100, the external light NL passes through the absorption type polarizing plate 21 and becomes linear polarized light parallel to the first transmission axis. Therefore, the external light NL passes through the liquid crystal layer 13 and then converted by 90° by the chirality of the liquid crystal layer 13. Accordingly, the external light NL becomes linear polarized light along the second transmission axis substantially orthogonal to the reflection axis of the reflection type polarizing plate 22, which is parallel to the first transmission axis, and passes through the reflection type polarizing plate 22 having the second transmission axis. Therefore, the external light NL is not reflected on the reflection type polarizing plate 22 (excluding reflected light due to leak light).

Further, the liquid crystal panel 100 may be used for any purpose. For example, the liquid crystal panel 100 is applicable in various usages such as a watch or a portable device (for example, the liquid crystal panel 100 in the transmission state allows information to be displayed on the display 200 located on the back side of the liquid crystal panel 100, and the liquid crystal panel 100 in the reflection state functions as a mirror), transmission/reflection control of a certain window (for example, the liquid crystal panel 100 in the transmission state functions as a window that transmits a scenery, and the liquid crystal panel 100 in the reflection state functions as a mirror), or a side mirror or a room mirror of an automobile (for example, the liquid crystal panel 100 in the transmission state allows vehicle information or a camera image to be displayed on the display 200 located on the back side of the liquid crystal panel 100).

Furthermore, as described above, the liquid crystal panel 100 is formed in a substantially rectangular shape when viewed in the normal direction of the substrates. Alternatively, the liquid crystal panel 100 may be formed in a circular shape, a polygonal shape, or another shape and may be formed in any shape depending on the application. Likewise, each of the transparent electrodes 11a, 12a may be formed in any shape when viewed in the normal direction of the substrates.

Moreover, the twisted nematic (TN) type liquid crystal element 10 having a twist angle of 90° is described above as an example, but not limited thereto. Alternatively, as long as the aforementioned reflection and transmission states can be realized by applying voltage to the liquid crystal layer 13, the twist angle may be below 90° or greater than 90°. For example, the liquid crystal element 10 may be a super twisted nematic (STN) type crystal element. In addition, as long as the reflection and transmission states can be realized by applying voltage to the liquid crystal layer 13, the first transmission axis of the absorption type polarizing plate 21 and the second transmission axis of the reflection type polarizing plate 22 may not be parallel or orthogonal to each other. Each of the optical axes and the rubbing direction of the corresponding alignment film may not be parallel or orthogonal to each other. Each optical axis can be shifted as appropriate in consideration of visual characteristics when the liquid crystal element is in the transmission state or in consideration of reflection characteristics when the liquid crystal element is in the reflection state.

In the above description, in order to facilitate understanding of the present invention, the description of known technical matters has been omitted as appropriate.

DESCRIPTION OF REFERENCE NUMERALS

100 Liquid crystal panel
10 Liquid crystal element
11 First substrate, 11a Transparent electrode, 12 Second substrate, 12a Transparent electrode
13 Liquid crystal layer, 13a Liquid crystal molecules
21 Absorption type polarizing plate
22 Reflection type polarizing plate
31 First transparent adhesive film
32 Second transparent adhesive film

The invention claimed is:

1. A liquid crystal panel switchable between a transmission state and a reflection state in response to application of voltage, the liquid crystal panel comprising:
    a liquid crystal element including a liquid crystal layer and transparent electrodes to apply voltage to the liquid crystal layer;
    an absorption type polarizing plate provided at one side of the liquid crystal element; and
    a reflection type polarizing plate provided at the other side of the liquid crystal element and located opposed via the liquid crystal element to the absorption type polarizing plate,
    wherein, in the reflection state, light incident on the absorption type polarizing plate and transmitted through the liquid crystal element becomes light having a polarizing axis along a reflection axis of the reflection type polarizing plate, and is reflected on the reflection type polarizing plate,
    in the transmission state, light incident on the absorption type polarizing plate and transmitted through the liquid crystal element becomes light having a polarizing axis along a transmission axis intersecting with the reflection axis of the reflection type polarizing plate, and is transmitted through the reflection type polarizing plate, and
    the absorption type polarizing plate has an average degree of polarization of 60% or greater and 80% or smaller at a wavelength of 450 nm to 650 nm.

2. The liquid crystal panel according to claim 1, wherein the average degree of polarization of the absorption type polarizing plate is 67% or greater at a wavelength of 450 nm to 650 nm.

* * * * *